(12) United States Patent
Orchard (10) Patent No.: US 11,048,401 B2
(45) Date of Patent: Jun. 29, 2021

(54) DEVICE, COMPUTER PROGRAM AND METHOD FOR GESTURE BASED SCROLLING

(71) Applicants: Sony Europe B.V., Weybridge (GB); Sony Corporation, Tokyo (JP)

(72) Inventor: Douglas Orchard, Malmo (SE)

(73) Assignees: Sony Europe B.V., Weybridge (GB); Sony Corporation, Tokyo (JP)

( * ) Notice: Subject to any disclaimer, the term of this patent is extended or adjusted under 35 U.S.C. 154(b) by 0 days.

(21) Appl. No.: 15/945,823

(22) Filed: Apr. 5, 2018

(65) Prior Publication Data

US 2018/0292960 A1    Oct. 11, 2018

(30) Foreign Application Priority Data

Apr. 6, 2017   (GB) ...................... 1705555

(51) Int. Cl.
| | | |
|---|---|---|
| *G06F 3/0485* | (2013.01) | |
| *G06F 3/0488* | (2013.01) | |
| *G06F 3/0484* | (2013.01) | |
| *G06F 3/0482* | (2013.01) | |
| *G07C 9/00* | (2020.01) | |
| *G04G 21/08* | (2010.01) | |

(52) U.S. Cl.
CPC .......... *G06F 3/0485* (2013.01); *G06F 3/0482* (2013.01); *G06F 3/04847* (2013.01); *G06F 3/04883* (2013.01); *G07C 9/00309* (2013.01); *G04G 21/08* (2013.01); *G06F 2203/04807* (2013.01); *G06F 2203/04808* (2013.01); *G07C 9/00944* (2013.01)

(58) Field of Classification Search
CPC ............... G06F 3/0485; G06F 3/04883; G06F 2203/04808; G06F 3/04847; G06F 3/0482; G06F 2203/04807; G07C 9/00944; G07C 9/00309; G04G 21/00; G04G 21/08
USPC ........................................... 715/784
See application file for complete search history.

(56) References Cited

U.S. PATENT DOCUMENTS

| | | | | |
|---|---|---|---|---|
| 2002/0000978 A1* | 1/2002 | Gerpheide | ............ | G06F 3/0236 345/173 |
| 2003/0043174 A1* | 3/2003 | Hinckley | ............ | G06F 3/03547 345/684 |
| 2006/0161871 A1* | 7/2006 | Hotelling | ............... | G06F 3/0485 715/863 |
| 2007/0155434 A1* | 7/2007 | Jobs | ...................... | G06F 3/0236 455/565 |
| 2007/0220443 A1* | 9/2007 | Cranfill | ............... | G06F 3/03547 715/786 |

(Continued)

FOREIGN PATENT DOCUMENTS

| | | |
|---|---|---|
| KR | 10-2014-0064690 | 5/2014 |
| WO | WO 2016/153207 A1 | 9/2016 |

*Primary Examiner* — Sherief Badawi
*Assistant Examiner* — Conrad R Pack
(74) *Attorney, Agent, or Firm* — Oblon, McClelland, Maier & Neustadt, L.L.P.

(57) ABSTRACT

A device is described that comprises display circuitry configured to emphasise a content item from a plurality of content items; touch screen circuitry configured to receive a user input; and control circuitry configured to: detect the user input on the touch screen circuitry, such that the emphasis on the content item scrolls through the plurality of content items when the detected user input is an arc in a first direction.

15 Claims, 11 Drawing Sheets

(56) References Cited

U.S. PATENT DOCUMENTS

| | | | |
|---|---|---|---|
| 2007/0236475 A1* | 10/2007 | Wherry | G06F 3/0485 345/173 |
| 2007/0262951 A1* | 11/2007 | Huie | G06F 3/0485 345/156 |
| 2008/0222559 A1* | 9/2008 | Kim | G06F 3/0488 715/785 |
| 2009/0008161 A1* | 1/2009 | Jones | G06F 3/044 178/18.06 |
| 2009/0187375 A1* | 7/2009 | Kinoshita | G06F 3/0485 702/158 |
| 2009/0265658 A1* | 10/2009 | Klishko | G06F 3/0416 715/786 |
| 2010/0058226 A1* | 3/2010 | Flake | G06F 3/0481 715/786 |
| 2011/0107259 A1* | 5/2011 | Haugh | G06F 3/0482 715/810 |
| 2011/0157046 A1 | 6/2011 | Lee et al. | |
| 2012/0038681 A1* | 2/2012 | Summers | G06F 3/04855 345/684 |
| 2013/0063384 A1* | 3/2013 | Ito | G06F 3/0485 345/173 |
| 2013/0113729 A1* | 5/2013 | Chiang | G06F 3/041 345/173 |
| 2014/0143737 A1 | 5/2014 | Mistry et al. | |
| 2015/0074614 A1* | 3/2015 | Walker | G06F 3/04883 715/863 |
| 2015/0186397 A1* | 7/2015 | Cueto | G06F 3/0482 715/854 |
| 2018/0349005 A1* | 12/2018 | Bhargava | G06F 3/04847 |

\* cited by examiner

DEVICE, COMPUTER PROGRAM AND METHOD FOR GESTURE BASED SCROLLING

CROSS REFERENCE TO RELATED APPLICATIONS

The present application claims priority to United Kingdom Application GB1705555.9 filed on 6 Apr. 2017, the contents of which being incorporated herein by reference in its entirety.

BACKGROUND

Field of the Disclosure

The present technique relates to a device, computer program and method.

Description of the Related Art

The "background" description provided herein is for the purpose of generally presenting the context of the disclosure. Work of the presently named inventor, to the extent it is described in the background section, as well as aspects of the description which may not otherwise qualify as prior art at the time of filing, are neither expressly or impliedly admitted as prior art against the present technique.

When a user interacts with a hand-held device having a touch screen, the size of the screen dictates to an extent the ease at which the user may interact with the device. For example, it is easier to interact with devices having large touch-screens as the screen real estate is greater. However, large screens may not be appropriate for the form factor of the device. In addition, in the event that a large screen is provided on a large device, one hand is required to hold the device whilst the other hand interacts with the touch screen.

Both of these are undesirable.

It is an aim of the disclosure to address these two issues.

SUMMARY

According to the disclosure, there is provided a device comprising display circuitry configured to emphasise a content item from a plurality of content items; touch screen circuitry configured to receive a user input; and control circuitry configured to: detect the user input on the touch screen circuitry, such that the emphasis on the content item scrolls through the plurality of content items when the detected user input is an arc in a first direction.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views.

Figure 1:
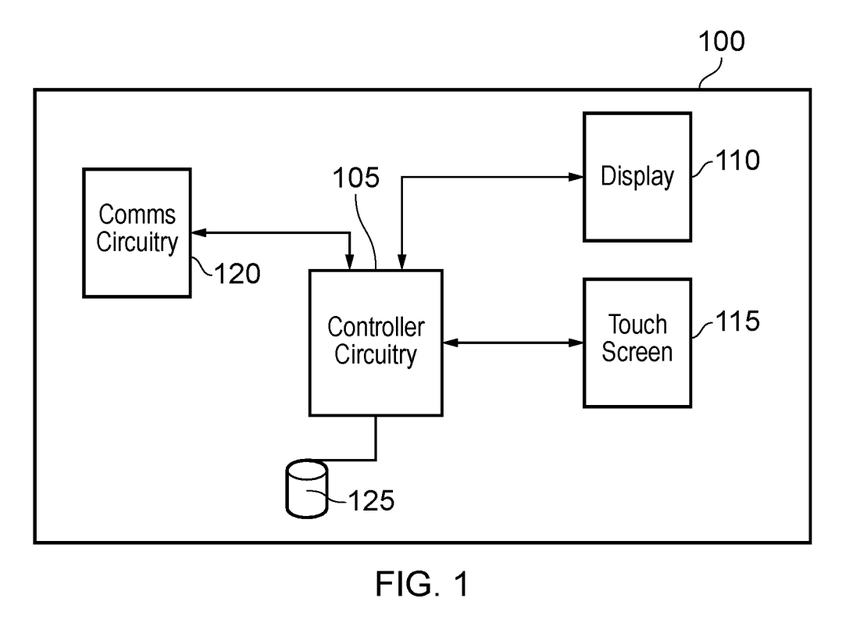
FIG. 1 shows a device 100 according to embodiments of the present disclosure.

Referring to FIG. 1, a device 100 according to embodiments of the disclosure is shown. The device 100 is, in embodiments, a key fob with a touchscreen. However, as would be appreciated, the device 100 may be any handheld device, such as a mobile telephone or the like.

The device 100 includes controller circuitry 105. The controller circuitry 105 may be embodied as a microprocessor which is controlled by computer readable instructions. Of course, the disclosure is not limited to this and the controller circuitry 105 may be an Application Specific Integrated Circuit (ASIC) or any kind of dedicated hardware.

In embodiments the controller circuitry 105 is controlled by computer readable instructions stored on storage 125. Storage 125 may be any kind of storage medium such as an optically readable storage medium or solid state storage medium which stores computer readable instructions. As noted above, these control the controller circuitry 105 in the device 100. In addition, a plurality of content items (which will be explained later) may also be stored in the storage 125. Storage 125 is connected to controller circuitry 105.

Additionally connected to controller circuitry 105 is a display 110. The display 110 may be an Organic Light Emitting Diode (OLED) type screen or any kind of screen capable of displaying the content items to a user.

Additionally connected to controller circuitry 105 is a touchscreen 115. The touchscreen 115 may be a capacitive type touchscreen or may be a resistive type touchscreen 115. The touchscreen 115 enables the user to control the operation of the controller circuitry 105 by interacting with the touchscreen 115. In particular, the touchscreen 115 is an example of a user input device that allows the user to input instructions to the device 100. The touchscreen 115 detects both touch and movement of an operating device such as a stylus or a finger or thumb used by the user to control the device 100.

Additionally connected to the controller circuitry 105 is communication circuitry 120. The communication circuitry 120 allows the device 100 to wirelessly communicate with another apparatus. For example, in the event that the device 100 is a key fob, the communication circuitry 120 allows the device 100 to communicate with a car or the door to a dwelling using Bluetooth or some other wireless communication Standard such as WiFi. In the example where the device 100 is a mobile terminal such as a mobile telephone, the communication circuitry 120 may include a cellular communication circuitry compliant with a telecommunications Standard such as Long Term Evolution (LTE) in addition to or as an alternative to other communication Standards.

Other circuitry such as a haptic feedback device (not shown) may also be included in the device 100.

Figure 2A:
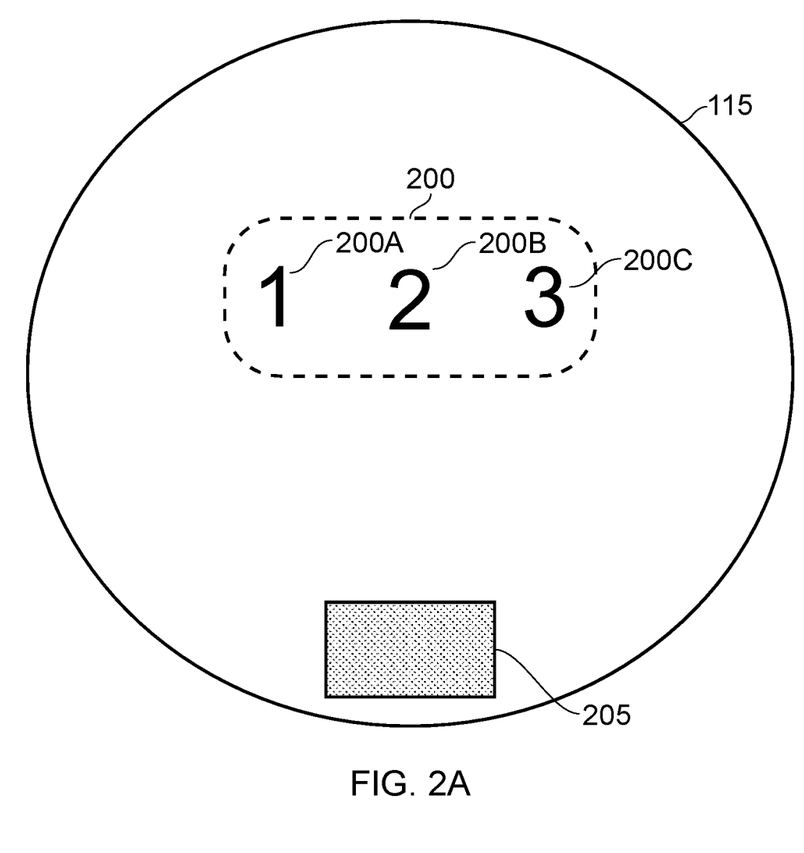
FIGS. 2A-2D show embodiments of the mechanism to scroll through content items.

Referring to FIG. 2A-2D, embodiments of the mechanism to scroll through content items is described. In FIG. 2A, the touchscreen 115 is shown as a circular shaped screen. Of course, the disclosure is not limited to this. For example, the touchscreen 115 may be any shape such as a square or rectangle and may cover any proportion of the device 100. For example, in the event that the touchscreen is part of the device 100 embodied as a key fob, the touchscreen may cover the entire front surface of the device. Alternatively, in the event that the touchscreen 115 is part of a device 100 embodied as a mobile telephone, the touchscreen may only cover a proportion of the device 100.

The touchscreen is overlaid onto the display 110. In other words, the user will see content items placed on the display 110 and will be able to interact with the displayed content items using the touchscreen 115. The touchscreen 115 will therefore detect a user input and will detect movement of the operating device used by the user to control the device 100.

The display 110 has a graphical representation of a handle 205 (referred to as the "handle") displayed on a bottom periphery of the display 110. This handle is shown as a rectangle which is an area on the touchscreen 115 that is easily visible to a user. The purpose of the graphical representation of the handle 205 is to provide a visual indication to the user where the operating device should touch the touchscreen. Accordingly, the provision of the handle 205 is purely optional.

Additionally provided on the screen is a plurality of content items 200. In the example of FIG. 2A, there are three content items; "1" 200A, "2" 200B, and "3" 200C. These content items may be menu items relevant to the device 100. For example, where the device 100 is a key fob, the content items may be menu items such as open car, open trunk, start engine, activate lights or the like. However, in the event that the device 100 is a mobile telephone, the content items may be menu items such as settings, mail, contacts or the like. Of course, the content items may be menu screens, or Audio/Video content, a series of images or the like. In some embodiments the content items may be displayed one at a time rather all or a subset being presented on the screen.

In addition, or alternatively, the content items may be images or video (or icons representative of images or video) which may be displayed to the user when selected.

In essence, content items are items displayed to the user which may be selected by the user.

Figure 2B:
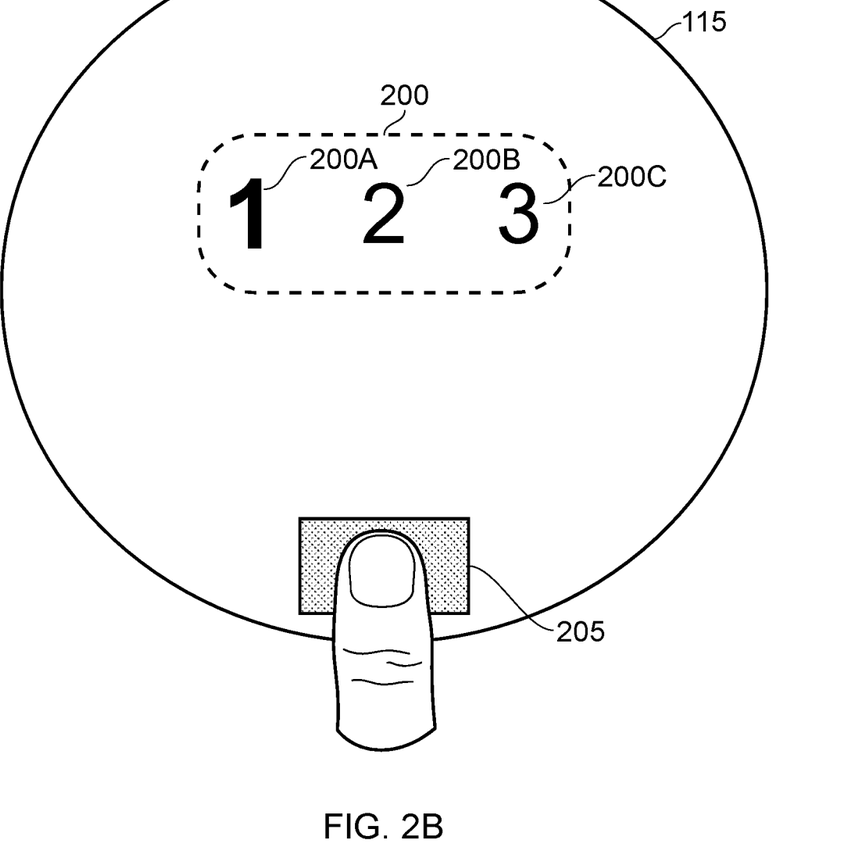

Referring to FIG. 2B, a first content item 200A is highlighted by default. This may be set by the manufacturer as a home content item or may be set by the user as a home content item. In addition and/or alternatively, the default content item may be learned by the device as being the most commonly accessed content item by the user.

As shown in FIG. 2B, the content item 200A is highlighted by increasing the size of the content item relative to the plurality of other content items and/or providing a visual indication of highlighting. For example, in this case the content item is shown in bold text. Of course, other mechanisms for highlighting are envisaged such as surrounding the content item 200A using a coloured square or the like.

As can be seen in FIG. 2B, the user interacts with the touchscreen 115. In particular, the user interacts with the device 100 by placing his or her finger on the handle 205. The touchscreen 115 therefore detects the touching operating performed by the user on the touchscreen at the position of the handle 205. The device 100 may, in response to the detection, also provide haptic feedback so that they feel a vibration indicating a touch has been detected.

Figure 2C:
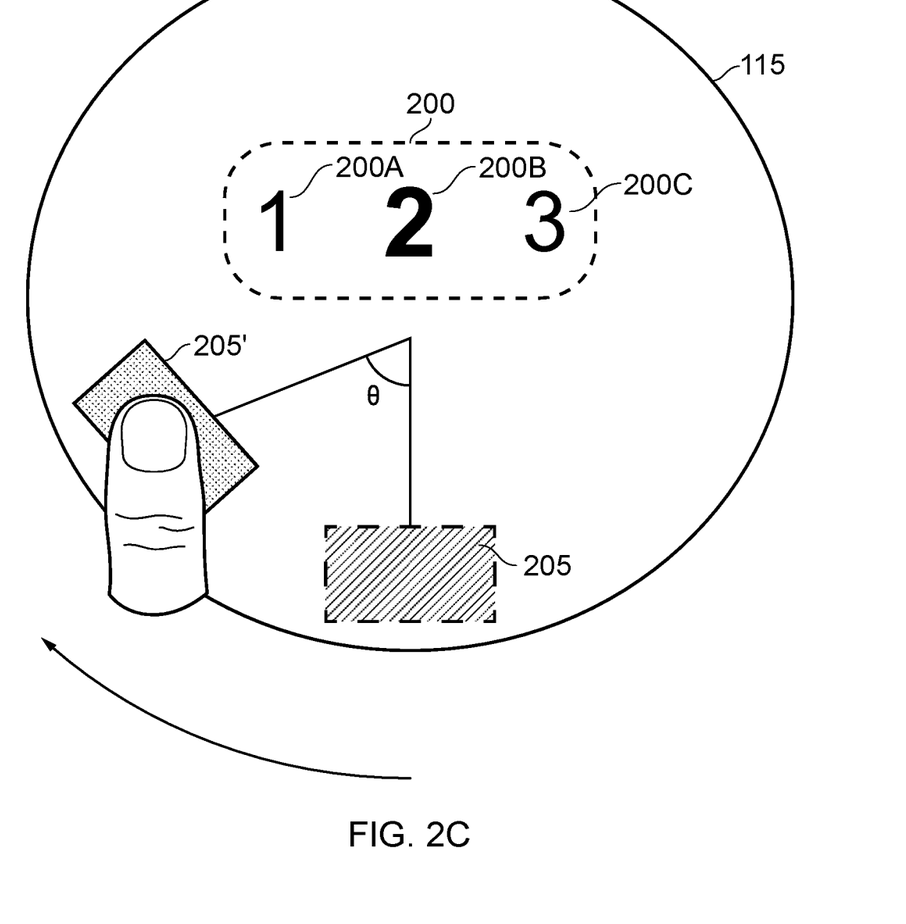

Referring to FIG. 2C, whilst maintaining the touching operation on the touchscreen above the handle 205, the user moves his or her finger in an arc shape indicated by the arrow to the left. It should be noted here that the term arc is intended to cover curve or any kind of circular shape.

The new position of the handle 205' is shown in FIG. 2C as the solid black rectangle. It is envisaged that the position of the handle 205' will move as the user's finger moves in the arc shape. The initial position of the handle 205 is shown as a hatched rectangle with dashed lines. As can be seen by FIG. 2C, the angle between the position of the handle 205' and the previous position of the handle 205 is indicated by $\theta$.

It is important to note that the movement of the touch action by the user is in an arc between the new position of handle 205' and the initial position of handle 205. The angle $\theta$ is, in embodiments, between 70-75 degrees. When the angle between the new position of handle 205 and the initial position of the handle is at a predetermined angle which is within this range in embodiments, the highlighted content item is scrolled. In other words, when the angle of movement of the arc of the touch on the touch screen moves to the predetermined angle relative to the vertical, the highlighted content item is scrolled. This is useful when the operating device is a user's thumb as this degree of movement is within the comfortable range for a user's thumb. In embodiments, the angle $\theta$ may be 72.5 degrees. Of course, other predetermined angles are envisaged such as 50 degrees or 85 degrees.

As noted above, in response to this arc being made to the predetermined angle, the highlighted content item (herein after referred to as the emphasised content item) scrolls to a new content item. In the example of FIG. 2C, the new emphasised content item is content item 200B. In addition to highlighting the emphasised content item 200B, the device 100 may also provide haptic feedback to the user to indicate that a new content item has been highlighted by scrolling. The type of haptic feedback may vary depending on the type of content item selected. For example, different strengths of haptic feedback may be provided so that when a content item is scrolled a small vibration is provided and where no more options are available, a larger vibration is provided.

As the movement over the touchscreen 115 is in arc, this allows the user to control the device 100 and to scroll through the content items using a single hand. In particular, this arrangement is particularly useful for controlling the device 100 using the thumb. In order to further assist this, it is advantageous if the touchscreen allows the arc movement to occur towards the bottom of the touchscreen 115.

Figure 2D:
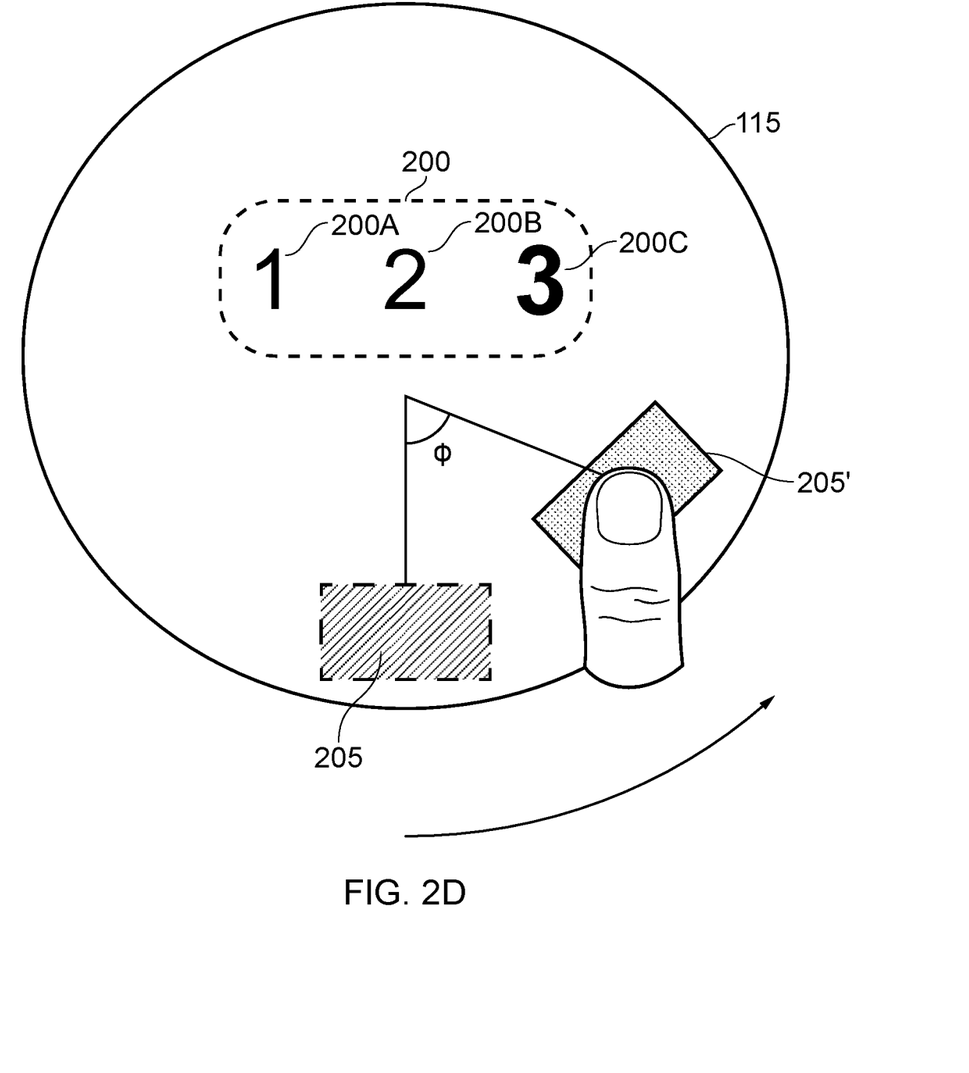

Referring to FIG. 2D, the user is shown moving the handle 205 to the right along an arc path. In particular, the user is shown moving the handle 205 from the vertical position indicated by the hatchings and the dotted lines to a new position 205'. This movement is through an arc shaped path (similar to that described with reference to FIG. 2C) and the angle between the new position 205' of the handle and the old position 205 of the handle is $\phi$.

In the event that the user moves the handle 205 to the new position 205', the content item is scrolled through to new content item 200C. It should be noted here that the use can scroll through the content items in the same direction by moving the handle in either direction relative to its starting position. In other words, irrespective of whether the user moves the handle to the left or to the right of its starting position 205, the content item will be scrolled through in the same direction.

Of course, the disclosure is not limited to this and the content items may be scrolled in the direction of the arc made by the user or in the opposite direction.

In addition, the speed of scrolling may depend upon the angle of rotation of the arc. In other words, if the user moves the handle 205 through a small arc of, say, 20 degrees, the content item may only scroll to the next content item in the sequence. Alternatively, if the user moves the handle 205 through a larger arc of, say, 87 degrees or 90 degrees, the content item may scroll to the final content item in the plurality of content items.

In addition or alternatively, the set of content items displayed may vary depending on the direction of arc of the handle 205. For example, one set of content items may be available if the user moves the handle 205 to the left and a second, different set of content items may be available if the user moves the handle 205 to the right.

In addition or alternatively, the user may move the handle 205 from its initial position to the predetermined angle of arc in a first direction. When the user stops touching the touchscreen 115, the handle 205 then moves to the predetermined angle of arc in the second direction. In this instance, the highlighted content item is scrolled. In order to stop scrolling through the content items, the user touches the touchscreen 115 again. This allows automatic scrolling through the plurality of content items.

Figure 3A:
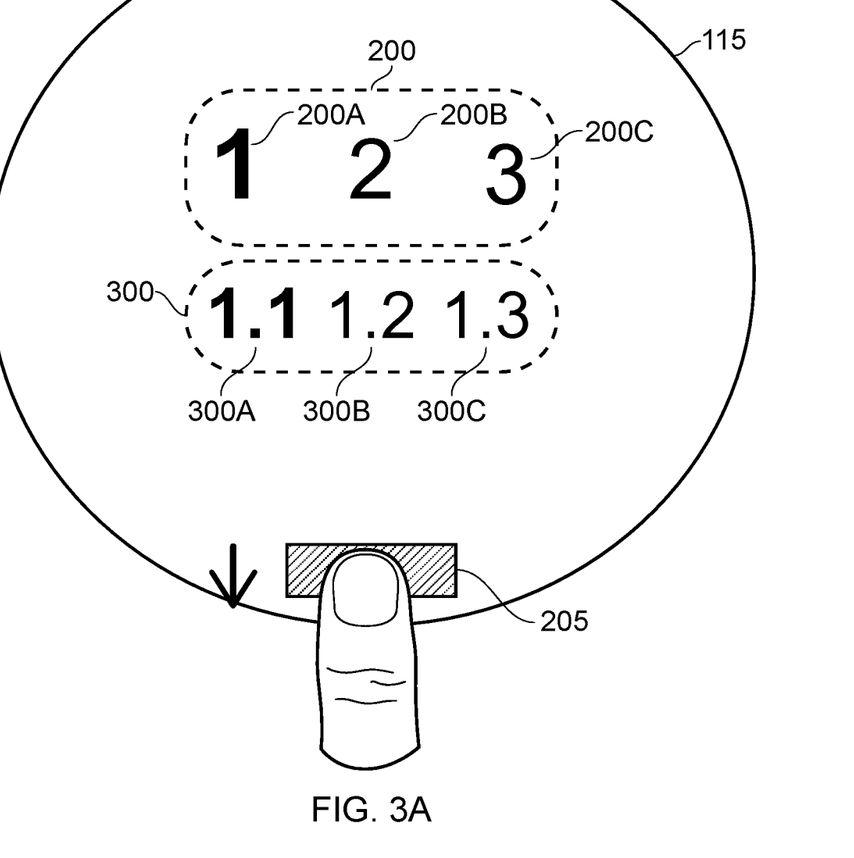
FIGS. 3A and 3B show an embodiment describing how the user moves between hierarchical levels of the content items.

Referring to FIG. 3A, an embodiment showing how the user moves between hierarchical levels of the content items is shown. In FIG. 3A, the plurality of content items 200 is shown. In FIG. 3A, the plurality of content items 200 are all of the same hierarchical level. This means that each of the content items 200A, 200B, 200C, have more detailed content items associated therewith.

In particular, as shown in FIG. 3A, content item 200A has three other content items associated with it. These are shown collectively as 300. This is a lower hierarchical level. The lower hierarchical level 300 contains three content items 300A, 300B and 300C.

To explain the content items in the lower hierarchical level, if the content item 200A is a menu item for "settings", the lower hierarchical level content items may include WiFi Settings, Email settings and network settings. Alternatively, if the content item 200A is a folder for images, the lower hierarchical level content items may include three images.

In order to access the lower hierarchical level, the displayed content item is highlighted. The user then touches the handle 205 and whilst applying pressure to the touchscreen 115, moves the operating device (in this case the user's finger) in a vertical direction. More specifically, the user moves their finger in a vertically downward direction. This is indicated by the arrow in FIG. 3A.

In order to graphically assist the user, the size of the handle may decrease as in FIG. 3A. Alternatively, or additionally, haptic feedback such as a double vibration may be provided to the user which would indicate to the user that a lower hierarchical level has been selected. The user can then scroll through the lower hierarchical level 300 using the arc motion explained with reference to FIGS. 2C and 2D.

Figure 3B:
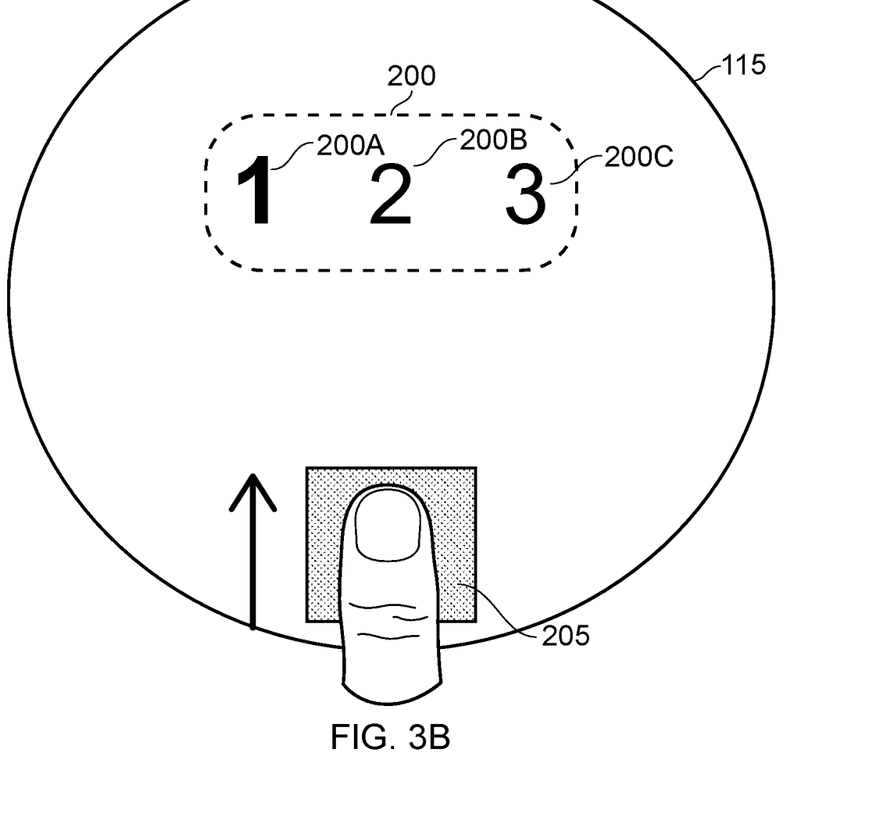

Referring to FIG. 3B, if a user wishes to return to the higher hierarchical level, then the user whilst maintaining contact with the handle, can push the handle in a vertical upward direction. Again, this may be represented graphically on the touchscreen 115 by increasing the size of the handle 205 indicated by the arrow in FIG. 3B. Additionally or alternatively, the device 100 may provide haptic feedback to the user in order to indicate that the user as moved to a higher hierarchical level.

By allowing the user to move between different hierarchical levels of content items using a vertical movement, this assists the user in operating the device 100 using a single hand. In particular, it is possible that the user can control the device 100 using his or her thumb.

Figure 4:
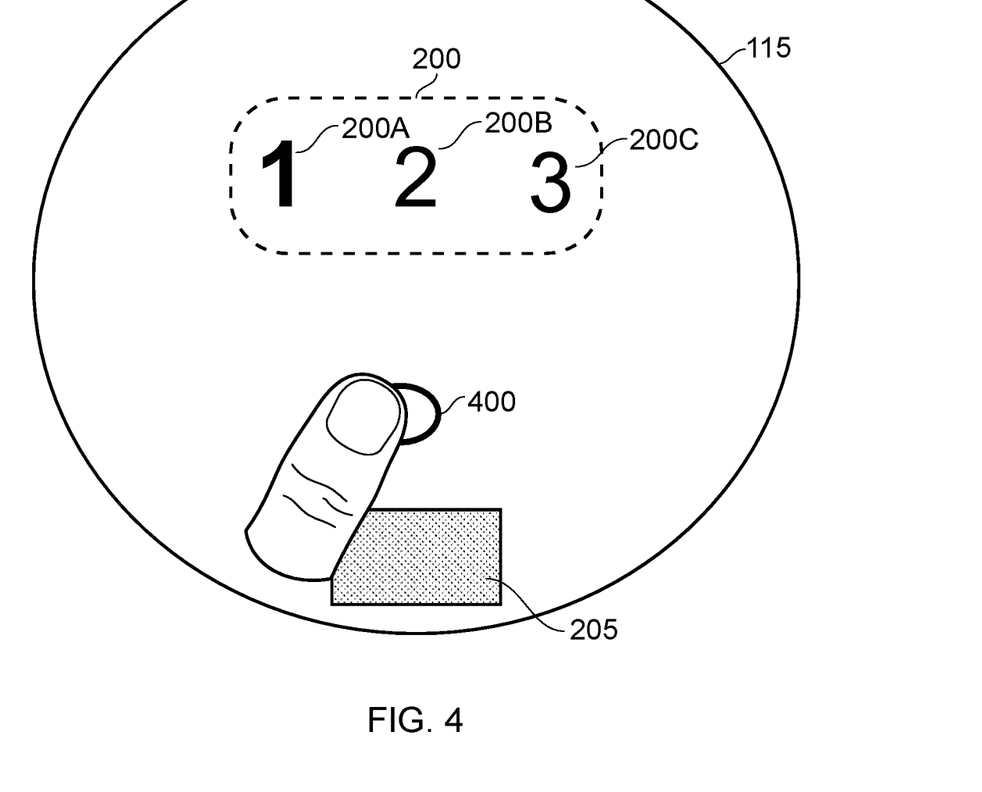
FIG. 4 shows embodiments of the disclosure in which the user can select a particular content item.

Referring to FIG. 4, embodiments of the disclosure are shown in which the user can select a particular content item. In FIG. 4, content item 200A is displayed as the highlighted content item (to which an action will be applied). In order to select content item 200A, the user removes his finger from the touchscreen 115. The user then touches the touchscreen 115 again. The touchscreen 115 therefore detects a further touch operation 400. In other words, the user lifts his or her finger from the displayed handle 205 and places his or her finger back on the touchscreen 115. In the example of FIG. 4, the user places his or her finger at position 400 indicated by the circle. This detection of a second touch input indicates that the user wishes to select the highlighted content item. The second touch input may be detected by touching a particular touch region on the touch screen 115 or by pressing the touch screen 115 for a predetermined time. This would reduce the likelihood of an erroneous input. Additionally, or alternatively, the touch may occur at a predetermined time when the handle 205 reaches a certain position on the swing when the correct menu item is emphasised.

Figure 5:
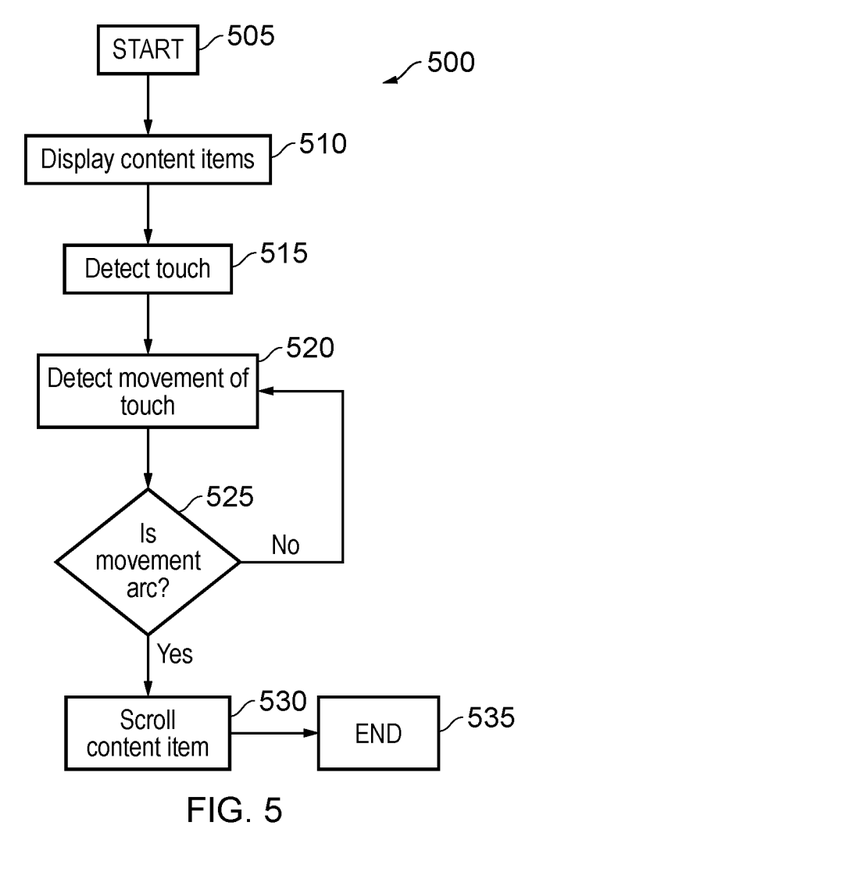
FIG. 5 shows a flowchart explaining the scrolling of the content items.

Referring to FIG. 5, a flowchart explaining the scrolling of the content items is shown. The flowchart 500 begins at step 505 where the process starts. The content items 200 are shown on the display in step 510. The touchscreen 115 then detects the touch 515 and passes this information to the controller circuitry 105 of the device 100. The touchscreen 115 then detects the movement of the touch in step 520. In particular, the touchscreen 115 detects the direction of movement of the touch applied to the touchscreen 115.

In step 525, the controller circuitry 105 determines whether the movement detected is in the shape of an arc. This occurs at step 525. In the event that the movement is not an arc (or substantially an arc), the no path is followed and the process returns to step 520. However, in the event that the movement is an arc whose angle exceeds a predetermined amount such as 70 or 75 degrees, the yes path is followed to step 530.

In step 530, the content item is scrolled in either one direction (irrespective of the direction of movement of the arc) or scrolled in the direction of the movement of arc. Haptic feedback may or may not be provided to the user to indicate the scrolling of the content item. The process then ends at step 535.

Figure 6:
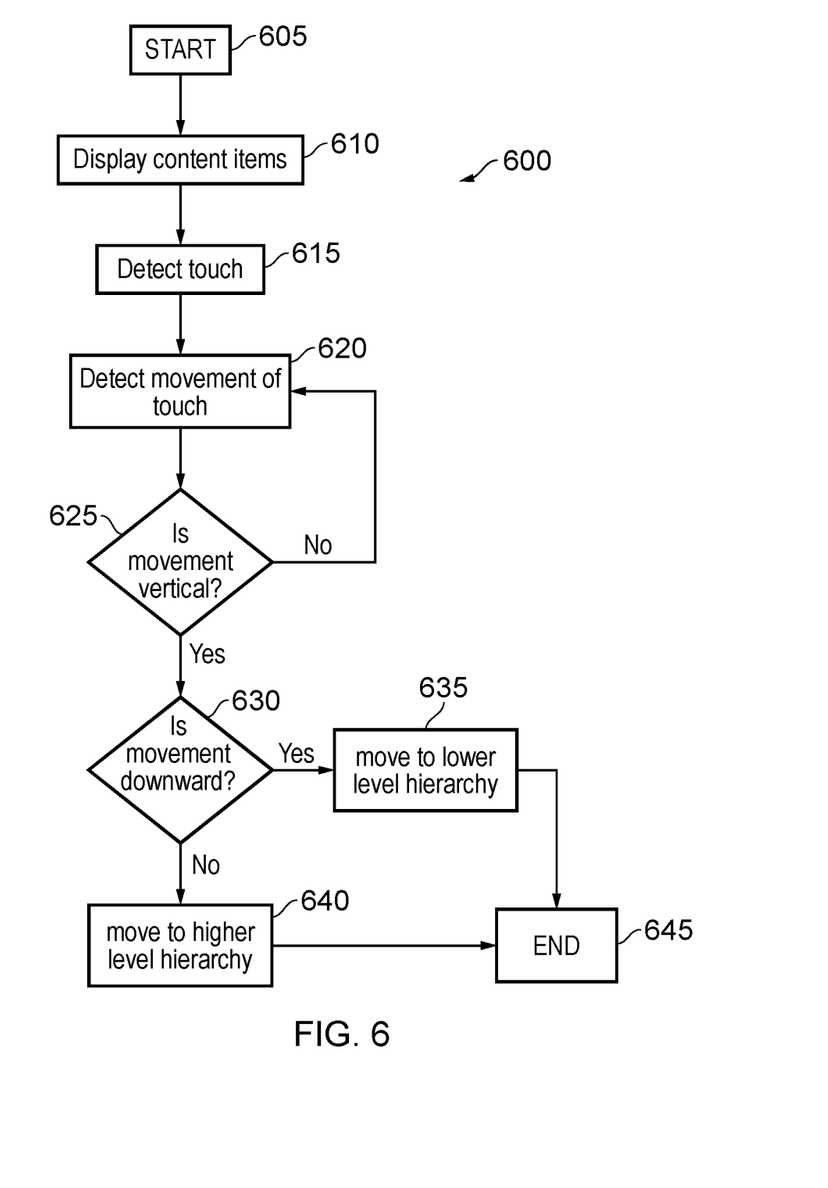
FIG. 6 shows a process explaining the movement between the different hierarchical levels of the content items.

Referring to FIG. 6, a process explaining the movement between the different hierarchical levels of the content items is shown. The process 600 starts at step 605. The content items are then displayed on the touchscreen 115 in step 610. The touchscreen 115 then detects the touch of the user in step 615. The movement of the touch is then detected in step 620.

The control circuitry 105 determines whether the detected movement is vertical in step 625. In the event that the movement is not vertical, the no path is followed and the process returns to step 620. However, in the event that the movement is vertical, the yes path is followed to step 630. The vertical movement is then analysed. If the vertical movement was downward, the yes path is followed to step 635 where the displayed content items are moved to a lower level hierarchical level in step 635. The process then ends in step 645.

Returning to step 630, if the vertical movement is not downward, the no path is followed to step 640. In step 640, the displayed content items are moved to a higher hierarchical level. The process then ends in step 645.

Figure 7:
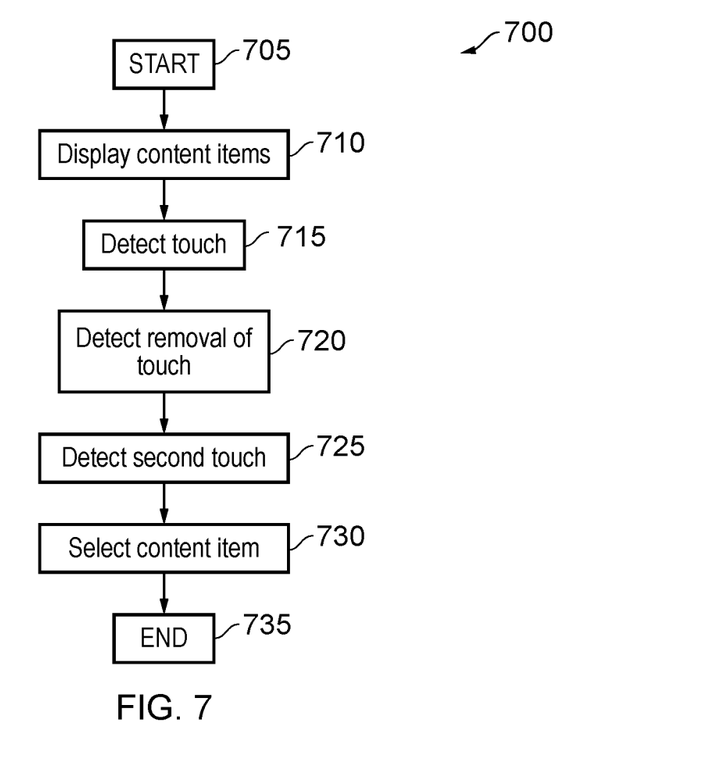
FIG. 7 shows a flowchart describing the selection of a content item.

Referring to FIG. 7, a flowchart showing the selection of a content item is described. The flowchart 700 starts in step 705. The process then moves to step 710 where the content items are displayed on the touchscreen 115. The touchscreen in step 715 then detects that a user has touched the touchscreen 115. The process then moves to step 720 where the controller circuitry 105 detects removal of that touch. The process moves to step 725 where a second touch on the touchscreen 115 is detected. The process moves to step 730 where, in the event of a detected second touch, the controller circuitry 105 selects the emphasised content item. The process then ends at step 735.

Although the foregoing has been described with the content items being arranged in a single list, the plurality of content items may be separated into groups. In this instance the most commonly accessed content item may be the default or home content item. Additionally, the next most commonly accessed content items may be placed to the immediate left and immediate right of the default content item. This allows the user to quickly scroll to the most commonly accessed content items.

In addition to the embodiments described above, the selection of a content item may be achieved by providing a default operation to the device 100. For example, in the event that the device 100 is a key fob, the car or home may provide a default action to the key fob via the communication circuitry 120. In this instance, the user merely needs to approve the default action. The user may then touch the touch screen and push upward or downward to approve the default action.

In addition to the above, the device 100 when embodied as a key fob may include a so-called "dead man's grip". This requires the user to hold the key fob when performing certain actions selected by the content item. For example, in the event that the selected content item is an auto-park function, the user must separately activate the auto-park function, after selection as described above, by providing a complete circular motion on the touch screen. The user will then need to hold the key fob and depress physical button (not shown) whilst the auto-park is carried out.

Indeed, the above disclosure is particularly useful for a key fob due to the small screen size available to display content items. For example, where the disclosure is applied to a key fob, scrolling through content items (and even selecting content items) using a single hand is very useful as this leaves a user's other hand free to carry luggage. Moreover, on the occasion that the key fob is used for autonomous vehicle operation, although the autonomous vehicle operation can be stopped by releasing the key fob, having a free hand is useful in case the user needs to correct the vehicle operation quickly for example to avoid a hazard in the road.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A device comprising display circuitry configured to emphasise a content item from a plurality of content items; touch screen circuitry configured to receive a user input; and control circuitry configured to: detect the user input on the touch screen circuitry, such that the emphasis on the content item scrolls through the plurality of content items when the detected user input is an arc in a first direction.

2. A device according to paragraph 1, wherein the plurality of content items are arranged in a plurality of hierarchical levels, wherein the control circuitry is configured to scroll through the content items in the same hierarchical level when the detected user input is the arc.

3. A device according to paragraph 1 or 2, wherein the control circuitry is configured to: detect a second touch input and when the second touch input is detected, select the emphasised content item.

4. A device according to any preceding paragraph, wherein the control circuitry is configured to scroll the content items when the detected arc is between 70° and 75° from the vertical.

5. A device according to any preceding paragraph, wherein the control circuitry is configured to continue scrolling through the content items when the detected user input is an arc in a second direction, the second direction being opposite to the first direction.

6. A device according to any preceding paragraph, wherein the control circuitry is configured to automatically continue scrolling through the content items until a further user input is detected.

7. A device according to any preceding paragraph, wherein the control circuitry is configured to move to a lower hierarchical level associated with the emphasised content item when the detected user input is a downward user input.

8. A device according to any preceding paragraph, wherein the control circuitry is configured to move to a higher hierarchical level associated with the emphasised content item when the detected user input is an upward user input.

9. A method of controlling a device comprising emphasising a content item from a plurality of content items; receiving a user input; detecting the user input, such that the emphasis on the content item scrolls through the plurality of content items when the detected user input is an arc in a first direction.

10. A method according to paragraph 9, wherein the plurality of content items are arranged in a plurality of hierarchical levels, and the method comprises scrolling through the content items in the same hierarchical level when the detected user input is the arc.

11. A method according to paragraph 9 or 10, comprising detecting a second touch input and when the second touch input is detected, selecting the emphasised content item.

12. A method according to any one of paragraph 9 to 11, comprising scrolling the content items when the detected arc is between 70° and 75° from the vertical.

13. A method according to any one of paragraph 9 to 12, comprising continue scrolling through the content items when the detected user input is an arc in a second direction, the second direction being opposite to the first direction.

14. A method according to any one of paragraph 9 to 13, comprising automatically continue scrolling through the content items until a further user input is detected.

15. A method according to any one of paragraph 9 to 14, comprising moving to a lower hierarchical level associated with the emphasised content item when the detected user input is a downward user input.

16. A method according to any one of paragraph 9 to 15, comprising moving to a higher hierarchical level associated with the emphasised content item when the detected user input is an upward user input.

17. A computer program product comprising computer readable instructions which, when loaded onto a computer, configure the computer to perform a method according to any one of paragraph 9 to 16.

The invention claimed is:

1. A device comprising:
   display circuitry configured to display a plurality of content items on a touch screen;
   touch screen circuitry configured to detect a user input on the touch screen; and
   control circuitry configured to:
   (i) cause the display circuitry to emphasize a first content item of the plurality of content items upon detection of the user input on a handle area displayed on the touch screen circuitry,
   (ii) cause the display circuitry to change, in a scroll direction of the plurality of the content items, the emphasis from the first content item to a second content item of the plurality of content items upon detection of the user input moving the handle area in an arc in a first direction,
   (iii) cause the display circuitry to change, in the scroll direction of the plurality of the content items, the emphasis from the second content item to a third content item of the plurality of content items upon detection of the user input moving the handle area in an arc in a second direction that is opposite to the first direction, and
   (iv) cause the display circuitry to display a lower or higher hierarchical level associated with a currently emphasized content item upon detection of the user input moving the handle area upward or downward.

2. The device according to claim 1, wherein the plurality of content items are arranged in a plurality of hierarchical levels, and wherein the control circuitry is configured to scroll through the content items in the same hierarchical level when the detected user input is the arc in the first direction or the arc in the second direction.

3. The device according to claim 1, wherein the control circuitry is configured to: detect a second touch input and when the second touch input is detected, select the currently emphasized content item.

4. The device according to claim 1, wherein the control circuitry is configured to scroll the content items when the arc in the first direction or the arc in the second direction is between 70° and 75° from a vertical axis.

5. The device according to claim 1, wherein the control circuitry is configured to automatically continue scrolling through the content items until a further user input is detected.

6. The device according to claim 1, wherein the control circuitry is configured to move to the lower hierarchical level associated with the currently emphasized content item when the detected user input is a moves the handle area downward.

7. The device according to claim 1, wherein the control circuitry is configured to move to the higher hierarchical level associated with the currently emphasized content item when the detected user input moves the handle area upward.

8. A method of controlling a device comprising:
   displaying a plurality of content items on a touch screen;
   detecting a user input on the touch screen;
   emphasizing a first content item from the plurality of content items upon detection of the user input on a handle area displayed on the touch screen;
   changing, in a scroll direction of the plurality of the content items, the emphasis from the first content item to a second content item of the plurality of content items upon detection of the user input moving the handle area in an arc in a first direction;
   changing, in the scroll direction of the plurality of the content items, the emphasis from the second content item to a third content item of the plurality of content items upon detection of the user input moving the handle area in an arc in a second direction that is opposite to the first direction; and
   displaying a lower or higher hierarchical level associated with a currently emphasized content item upon detection of the user input moving the handle area upward or downward.

9. The method according to claim 8, wherein the plurality of content items are arranged in a plurality of hierarchical levels, and the method comprises scrolling through the content items in the same hierarchical level when the detected user input is the arc in the first direction or the arc in the second direction.

10. The method according to claim 8, further comprising:
    detecting a second touch input and when the second touch input is detected, selecting the currently emphasized content item.

11. The method according to claim 8, comprising scrolling the content items when the arc in the first direction or the arc in the second direction is between 70° and 75° from a vertical axis.

12. The method according to claim 8, comprising automatically continuing scrolling through the content items until a further user input is detected.

13. The method according to claim 8, comprising moving to the lower hierarchical level associated with the currently emphasized content item when the detected user input is a moves the handle area downward.

14. The method according to claim 8, comprising moving to the higher hierarchical level associated with the currently emphasized content item when the detected user input moves the handle area upward.

15. A non-transitory computer readable medium having instructions stored therein, which when executed by a processor causes the processor to execute a method comprising:
   displaying a plurality of content items on a touch screen;
   detecting a user input on the touch screen;
   emphasizing a first content item from the plurality of content items upon detection of the user input on a handle area displayed on the touch screen;
   changing, in a scroll direction of the plurality of the content items, the emphasis from the first content item to a second content item of the plurality of content items upon detection of the user input moving the handle area in an arc in a first direction;
   changing, in the scroll direction of the plurality of the content items, the emphasis from the second content item to a third content item of the plurality of content items upon detection of the user input moving the handle area in an arc in a second direction that is opposite to the first direction; and
   displaying a lower or higher hierarchical level associated with a currently emphasized content item upon detection of the user input moving the handle area upward or downward.

* * * * *